US006526337B2

(12) United States Patent
Gardner

(10) Patent No.: US 6,526,337 B2
(45) Date of Patent: *Feb. 25, 2003

(54) SUPERVISORY CONTROL SYSTEM FOR AIRCRAFT FLIGHT MANAGEMENT DURING PILOT COMMAND ERRORS OR EQUIPMENT MALFUNCTION

(76) Inventor: Conrad O. Gardner, 121 Vine St., Unit 2202, Seattle, WA (US) 98124-2207

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/538,046
(22) Filed: Mar. 29, 2000
(65) Prior Publication Data
US 2002/0035415 A1 Mar. 21, 2002

(51) Int. Cl.[7] .................................................. G06F 7/00
(52) U.S. Cl. ................................ 701/3; 701/9; 340/945; 244/75 R; 244/158 R
(58) Field of Search ............................ 701/3, 9, 14, 15, 701/24, 25, 63; 244/75 R, 158 R, 189; 340/500, 945

(56) References Cited

U.S. PATENT DOCUMENTS

| 3,327,973 A | | 6/1967 | Kramer et al. ................. 77/244 |
| 3,557,304 A | | 1/1971 | Rue et al. |
| 4,283,705 A | * | 8/1981 | James et al. ................. 340/973 |
| 4,875,646 A | * | 10/1989 | Browning et al. ........... 244/190 |
| 5,067,674 A | | 11/1991 | Heyche et al. .............. 190/244 |
| 5,123,112 A | * | 6/1992 | Choate ........................ 455/452 |
| 5,714,948 A | | 2/1998 | Farmakis et al. ........... 961/340 |

* cited by examiner

Primary Examiner—Gertrude Arthur
(74) Attorney, Agent, or Firm—Conrad O. Gardner

(57) ABSTRACT

A system and method for intervention control of an aircraft in the event of pilot command error whether voluntary or involuntary. Impending detection of a chaotic condition associated with a maneuvering aircraft enable early prediction and control of the aircraft where solutions based upon performance prediction are available. A further feature of the present intervention control of the aircraft enables an equipment malfunction detection signal substitution of a satisfactory equipment signal.

8 Claims, 4 Drawing Sheets

SUPERVISORY CONTROL SYSTEM FOR AIRCRAFT FLIGHT MANAGEMENT DURING PILOT COMMAND ERRORS OR EQUIPMENT MALFUNCTION

BACKGROUND OF THE INVENTION

1. Field of the Invention

This invention relates generally to a flight safety system and more particularly to a method and apparatus for preventing accidents resulting from pilot command errors or equipment malfunctions during the flight of an aircraft.

2. Description of the Prior Art

Heretofore, alarm systems have sounded to indicate that a major problem has occurred on the aircraft that the flight crew must attend to immediately, e.g.:

a. The aircraft's speed has exceeded a predetermined safe mach level, e.g. 0.86 mach.

b. Cabin pressure has fallen below acceptable levels.

c. The autopilot has become disconnected for reasons other than pilot command.

d. Fire indication.

e. Improper take-off or landing configurations.

Heretofore, the pilot of the aircraft has been depended upon to respond to events a. through e.

Prior systems failures aboard the aircraft such as failure of the instrument landing system, automatic braking system, autopilot etc. have heretofore afforded the pilot of the aircraft no known remedy except to fly the aircraft with such systems inoperative.

BRIEF SUMMARY OF THE INVENTION

The present invention provides support services for equipment aboard an aircraft normally heretofore available only at a ground service facility.

Input signals from equipment aboard the aircraft are coupled via a data link to corresponding ground equipment continuously maintained as a standard by e.g. the manufacturer. An equipment substitution signal commands an output signal from the ground equipment standard to be substituted for the equipment output signal aboard the aircraft. The output signal transmitted from the ground equipment is an information signal transmitted over a data link reconditioned as required to the proper signal level required by the equipment aboard the aircraft. An equipment substitution signal is generated in response to comparison of the aircraft equipment signal with the standard.

Failure of airborne equipment does not result in loss of this equipment during flight thus handicapping the pilot in flight of the aircraft.

A further important feature of the system of the present invention is the provision for override of pilot control when a pilot command error is detected. A pilot command error may occur when an incorrect flight configuration and operating parameters are detected whether voluntary or involuntary. The present system provides immediate override should this be necessary in the event of pilot inability to respond through immediate voice communication where time permits. The present ground system override permits a pilot at the ground station through activated ground controls corresponding to the aircraft's flight controls to fly the aircraft. The pilot in command at the ground station may, instead of controlling the flight of the aircraft manually, utilize a flight control computer containing further flight control programming not available to the pilot flight control computer, e.g. containing programs for flying the aircraft in rarely occurring emergency situations such as loss of a functioning control surface where immediate control signals are required in response to uncontrolled maneuvering of the aircraft which control signals are based upon understanding and calculations of flow physics.

DETAILED DESCRIPTION OF THE INVENTION

Introduction

Transmission of digital data between each commercial aircraft and the proper airline flight operations department occurs today through ACARS (Aircraft Addressing and Reporting System) developed by ARINC (Aeronautical Radio Inc.). Such data presently includes aircraft identification, fuel data, engine performance data, etc. Development of broadband communications between aircraft, in flight satellite communications links, H.F. (high frequency) links, etc. are expanding the potential for increased data transfer and will reduce the need for an extensive network of ground stations. These efforts at improving data transfer rates will facilitate increased use of systems such as hereinafter described. Close monitoring of aircraft performance and control of the aircraft under emergency conditions based upon early data as hereinafter described will increase the probability of recovery under such conditions. Improved support functions for aircraft in flight will result from early detection of equipment malfunction and replacement of corrected output signals for the malfunctioning equipment.

Figure 1:
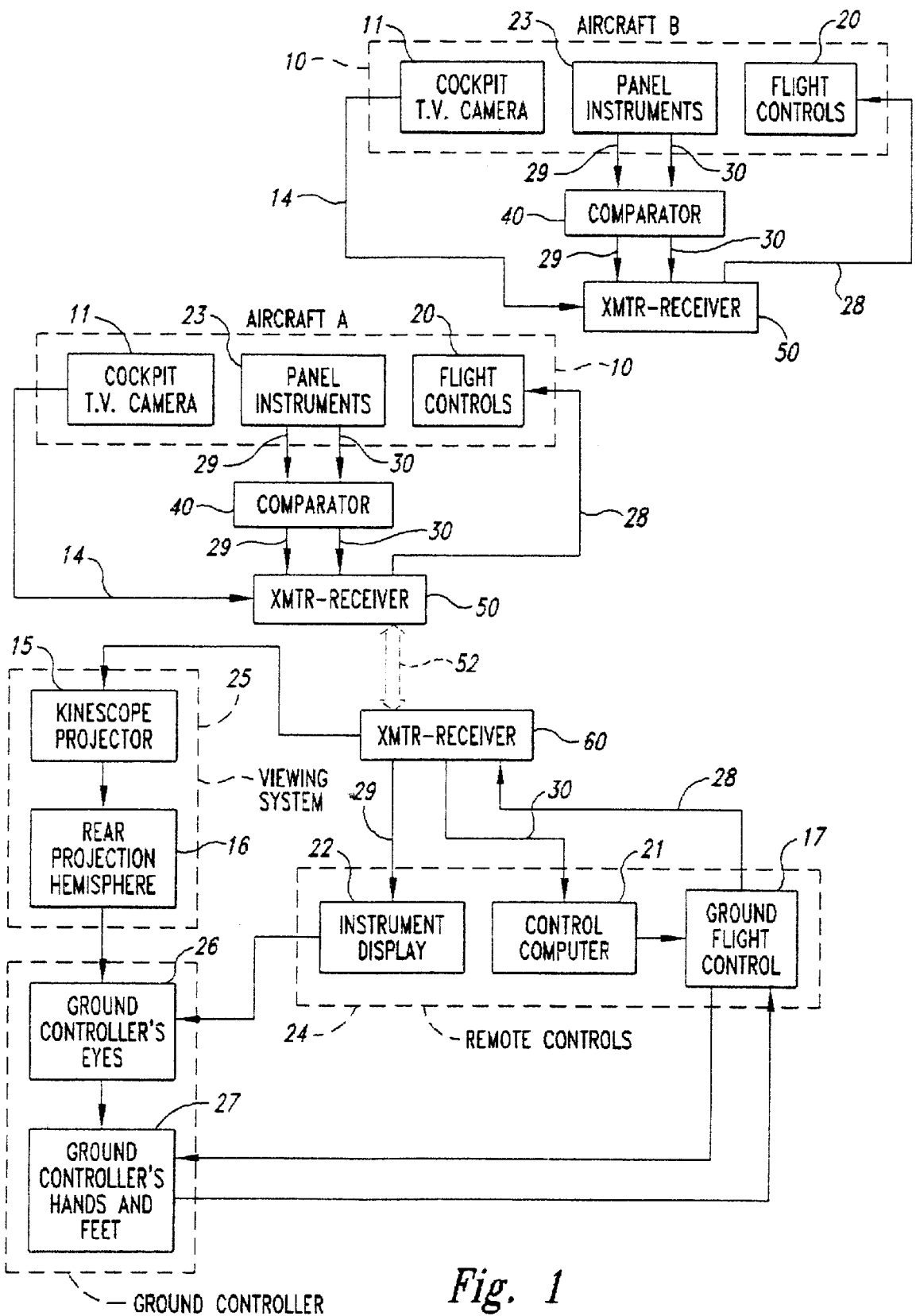
FIG. 1 is a block diagram of an embodiment of the present system showing an aircraft under control of the present intervention control system and a further aircraft transparent to the present intervention control system.

Turning now to the system of FIG. 1, there is shown an aircraft B having a flight control system 20 which includes a flight control computer which interfaces with a number of aircraft systems, various aircraft sensors, e.g. aileron position sensor, rudder position sensor, flap position sensors etc. Also as known in the art, the flight control computer connects to aircraft instrumentation as well as aircraft autopilot servos for actuating and controlling the aircraft aileron, rudder, flaps, spoilers etc. Flight control systems including a flight control computer are well known as shown e.g. in U.S. Pat. No. 5,714,948, the details of which are incorporated herein by reference.

Aircraft A also includes a flight control system 20 as hereinbefore described and shown in aircraft B. Remote control of aircraft commenced with hobbyists and later more sophisticated remote control systems appeared in the patent literature e.g. as shown in U.S. Pat. Nos. 5,067,674 and 3,557,304. U.S. Pat. No. 3,3557,304 is illustrative of a system where a cockpit T.V. camera 11 provides a display 16 of panel instruments 22 at the ground station for control of the aircraft. The above remote control system of U.S. Pat. No. 3,557,304 is incorporated herein by reference and is useful in controlling the flight of aircraft A or aircraft B under conditions unique to the present system only where comparator 40 is actively controlling aircraft A in a manner hereinafter described. Aircraft B is not under remote control and is transparent to remote ground control since comparator 40 in aircraft B has not detected a pilot command error signal thereby activating transmitter-receiver 50.

Figure 2:
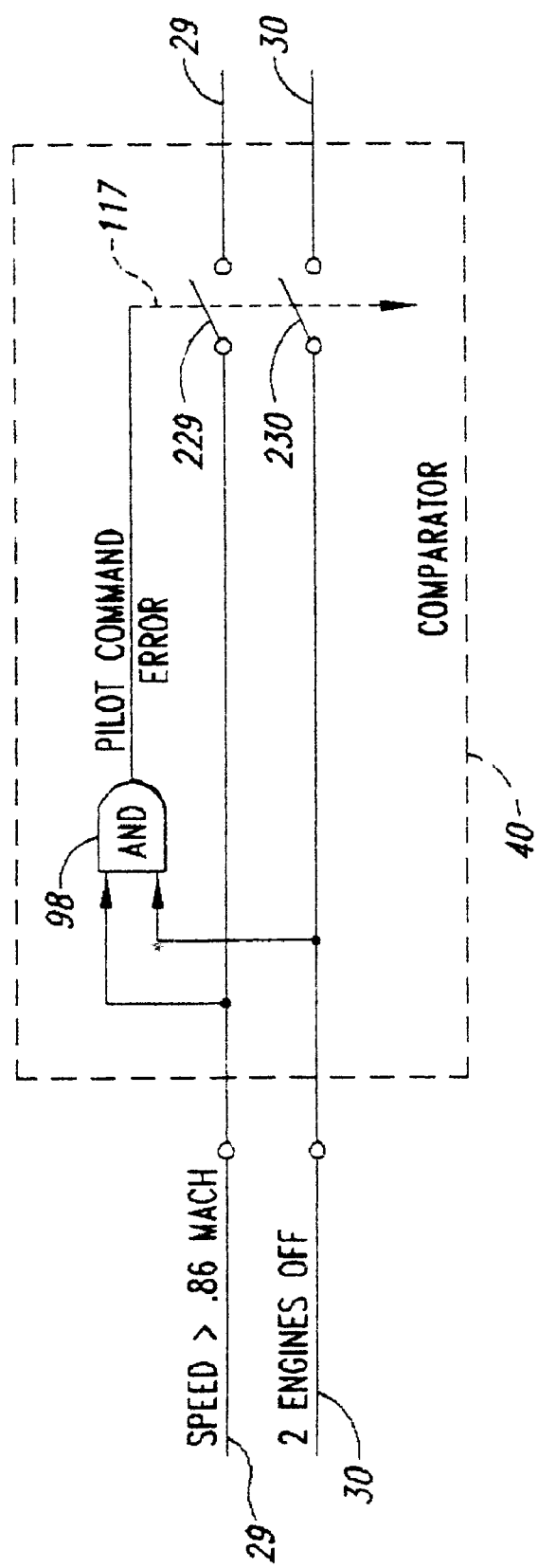
FIG. 2 is exemplary of a comparator circuit utilized in the present intervention control system of FIG. 1 for a twin engine commercial jet aircraft providing automatic back up in the event of a pilot error.

Turning now to FIG. 2 illustrative of comparator circuit 40 there are seen aircraft instrument data information signals, signal 29 representative of aircraft speed and a further signal 30 representative of a 2 engine OFF condition for a twin engine commercial jet aircraft. As shown in comparator circuit 40 of FIG. 2, when signal 29 representative of aircraft speed exceeds 0.86 mach AND a signal 30 representative of a 2 engine OFF condition are provided as inputs to comparator circuit 40, then a pilot command error signal is provided by AND circuit 98. Pilot command error signal 117 drives a relay closing switches 229 and 230 activating transmitter-receiver 50 and providing data transfer 25 through data link 52 to ground station transmitter-receiver 60 for remote control of aircraft A. While comparator 40 with the aforementioned input signals 29 and 30 as shown in FIG. 2 for a twin engine commercial jet aircraft clearly illustrate immediate generation of a pilot command error signal 117 and need for instant remote control by a ground station to avoid a potentially catastrophic incident, it will be recognized by those skilled in the art from the foregoing that other combinations of flight data indicative of incipient need for generation of a pilot command error signal 117 and ground control will become apparent e.g. a pair of input signals such as the combination of low cabin temperature representative of the approach of dangerous interior icing AND an ON autopilot would necessitate ground control. In the above example of pilot command error it is important to observe that pilot command error signal 117 is generated at the instant that the twin engine OFF signal appears as an input to comparator 40 together with an aircraft speed signal exceeding 0.86 mach, thus transferring control to the ground control and thereby enabling recovery action to be taken before the occurrence of further abnormal maneuvering of the aircraft. A further example would be the combination during final descent of signal representative of a flight path angle exceeding the flight path angle for the runway and a signal representative of pull up commands from the aircraft's proximity warning system.

Figure 3:
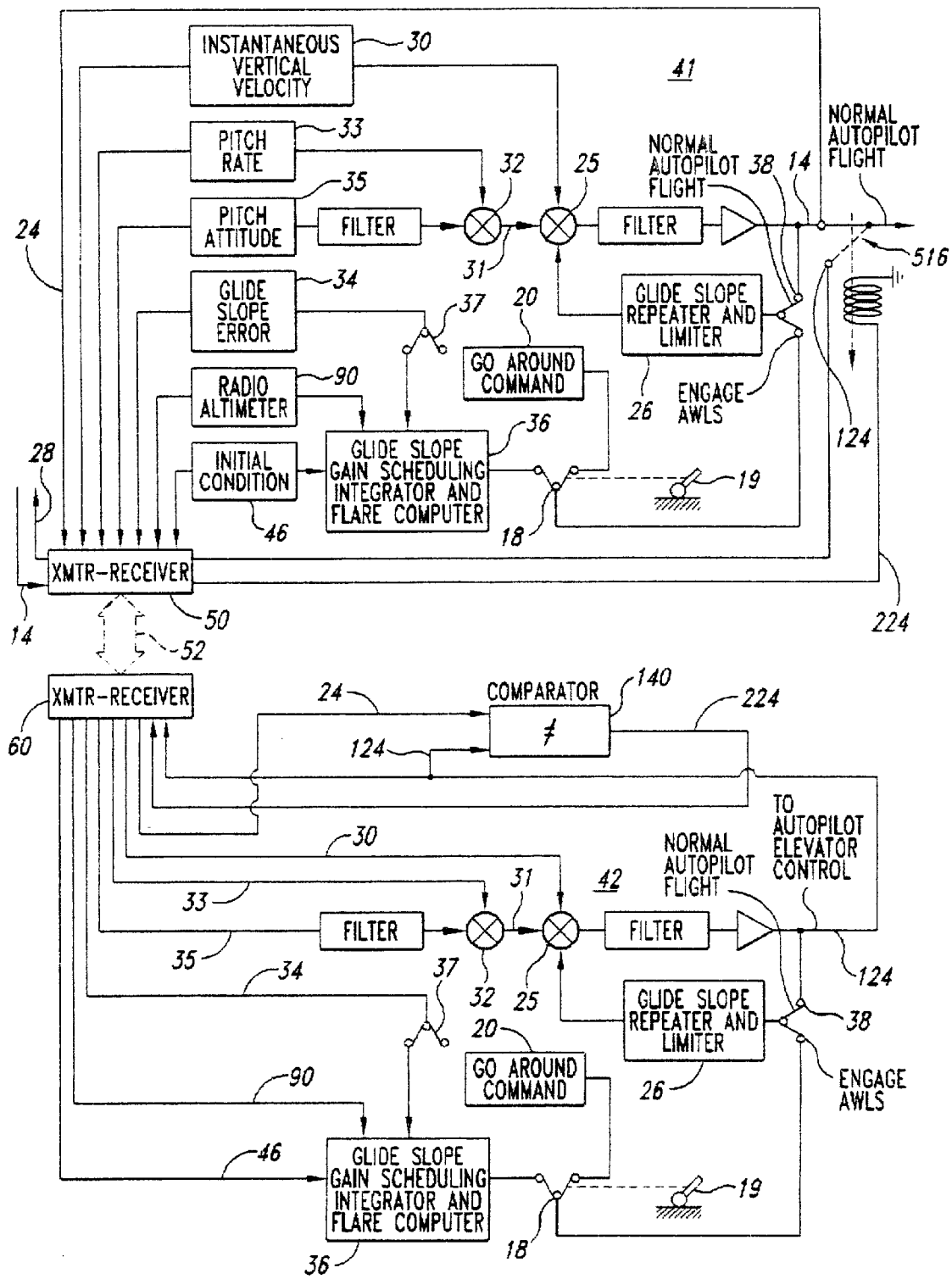
FIG. 3 is illustrative of the present system ground equipment substitution in the event of the presence of an equipment substitution signal representative of a corresponding equipment failure aboard an aircraft.

Turning now to FIG. 3 there is seen a flight control system 41 aboard an aircraft in flight and there is also seen an identical flight control system 42 which is located at a ground station and is tested as a standard frequently by ground personnel from the manufacturer of these flight control systems. Flight control system 41 aboard the aircraft in flight and the counterpart standard flight control system 42 at the ground station here are shown in U.S. Pat. No. 3,327,973 and taken for illustrative purposes only since different types of flight control systems for various aircraft will require their matching ground station counterpart for generation of an equipment substitution signal 224 in the system of FIG. 3. Transmitter-receiver 50 aboard an aircraft and transmitter-receiver 60 at the ground station in FIG. 3 correspond to transmitter-receiver 50 aboard aircraft A and transmitter-receiver 60 at the ground station in FIG. 1. A comparator circuit 140 as shown in FIG. 3 looks at output signal 24 of flight control system 41 aboard the aircraft (transmitted through data link 52) and compares the output signal 24 with output signal 124 from standard ground control flight control system 140 and if there is inequality causes equipment malfunction detection signal 224 to be transmitted via data link 52 to energize switch 516 to the dotted line position thereby transmitting standard flight control output signal 124, to autopilot elevator control of the aircraft in substitution of the flight control output signal 24 from the malfunctioning aircraft equipment. It should be noted that ground flight control system 42 receives the identical input signals via data link 52 as flight control system 41 aboard the aircraft.

While generation of an equipment malfunction detection signal for an aircraft flight control system has been described, it will be recognized by those skilled in the art that other systems aboard the aircraft may be checked either continuously or periodically with a manufacturers ground system standard depending upon the data communication channel characteristics available including bandwidth, data transfer rates and number of aircraft monitored for equipment malfunctions by the present system.

Figure 4:
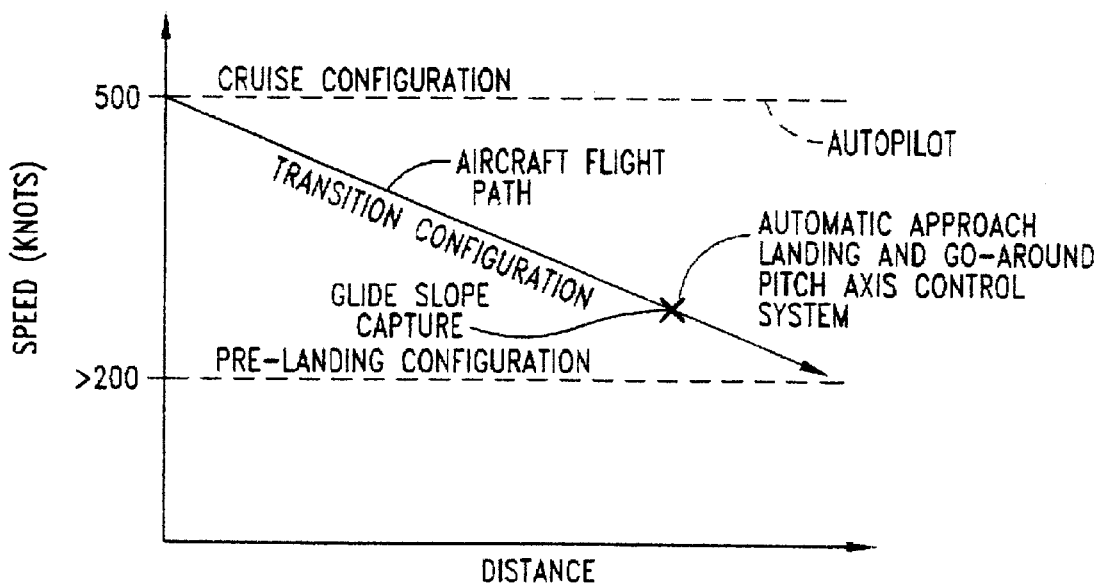
FIG. 4 is a diagram illustrative of normal configurations at different altitudes utilized under normal conditions; and, FIG. 5 is illustrative of an exemplary type of flight control system for flight control based upon input flight control signal information received from an aircraft data link to a ground station which information signals are representative of abnormal maneuver of an aircraft during an emergency condition.

Turning now to FIG. 4, it can be seen that aircraft during flight experience several configurations including cruise configuration, pre landing configuration and transition configurations prior to achieving a pre landing configuration.

Figure 5:
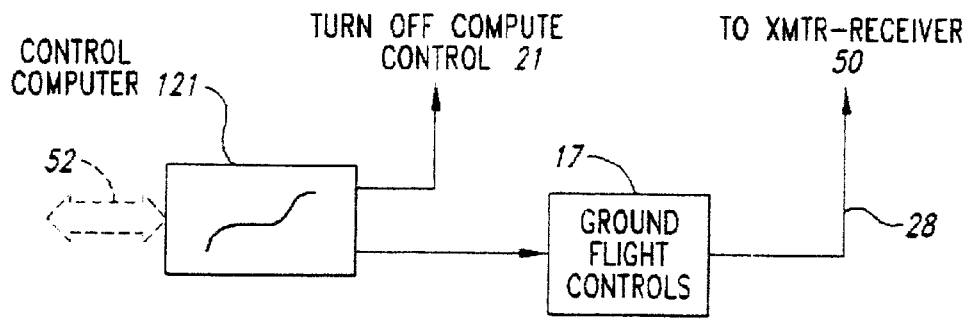

Hereinbefore described was the generation of a pilot command error signal 107 based upon recognized known conditions requiring immediate remote control from a ground station however predicting aircraft behavior and providing aircraft control of maneuvering aircraft due to various possible equipment and/or aircraft control surface failures is beyond the capability of even an experienced pilot under most circumstances since these are rare occurrences. Behavior of an aircraft under such conditions requires wind tunnel testing, analytical and computational studies for each of a number of single or combinations of abnormal configuration flight conditions. Unsteady forces, moments, surface pressures etc. all have to be studied to provide correct controls under such circumstances. Occurrences of undesired events such as stall below glide slope capture in a pre landing configuration allow minimal opportunity for correction and the system of FIG. 5 in contrast is in general directed to recoveries at higher altitudes from abnormal maneuvering configurations based upon analysis of non-linear aerodynamics. The system of FIG. 5 inputs flight control information signals from an aircraft via data link 52 to a control computer 121 at the ground station which provides output signals to ground flight control 17 for transmission of flight control signals 28 to control the aircraft in flight instead of utilization of ground control computer 21 hereinbefore discussed for control under normal flight. Of importance is the immediate and early detection of flight control information signals representative of abnormal maneuvering so that control computer 21 can provide immediate flight control signals 28 for corrective action prior to time lapse and further deterioration of flight control of the aircraft.

What is claimed is:

1. A supervisory control system for aircraft flight management comprising in combination:

an aircraft having a flight control system and an instrument panel;

a comparator circuit aboard said aircraft, said comparator circuit responsive to said flight control system for generating an error signal in response to a pilot command error;

a ground station;

a data link between said aircraft and said ground station for exchanging data between said aircraft and said ground station;

said ground station having a simulated cockpit and flight control system corresponding to the flight control system aboard said aircraft;

said ground station having an instrument panel corresponding to the instrument panel aboard said aircraft;

said error signal enabling said data link for transmitting the information displayed on the instrument panel aboard said aircraft to the ground station instrument panel; and said error signal further decoupling the flight control system aboard said aircraft and coupling the flight control system in the simulated cockpit in said ground station to control the flight of said aircraft through said data link.

2. The combination according to claim 1 wherein said comparator circuit is responsive to the positioning of engine control levers in a twin engine aircraft to the cut off position and an aircraft speed signal exceeding 0.86 mach.

3. An aircraft equipment signal substitution system comprising in combination:

a plurality of control systems aboard an aircraft;

a ground station having a plurality of control systems corresponding to said plurality of control systems aboard said aircraft;

a data link between said aircraft and said ground station for exchanging data between said aircraft and said ground station;

said plurality of control systems at said ground station responsive to the inputs of said plurality of control systems aboard said aircraft for providing output control system data for each of said plurality of control systems at said ground station;

said ground station having a comparator circuit for comparing said output system control data for each of said plurality of control systems at said ground station with the output system control data for each of said plurality of control systems aboard said aircraft and generating an equipment substitution signal when the output system control data of any of said plurality of control systems aboard said aircraft differs from the output system control data from the corresponding one of said plurality of control systems at said ground station; and, disconnecting the output system control data from the control system aboard said aircraft which differs from the output control system control data from the corresponding of one said plurality of control systems at said ground station in response to said equipment substitution signal and inserting the output system control data from the corresponding one of said plurality of control systems at said ground station.

4. The combination according to claim 3 wherein a corresponding one of said plurality of control systems comprises an autopilot.

5. A method for intervention control of an aircraft in the event of a pilot command error whether voluntary or involuntary comprising the steps of:

generating an alert signal representative of a pilot command error; and, transferring flight control management from said aircraft to a remote ground station in response to said alert signal representative of a pilot command error thereby providing instant remote control by the remote ground station to avoid a potentially. catastrophic incident.

6. A method of detecting an equipment malfunction aboard an aircraft in flight and substituting valid output signals for the malfunctioning equipment comprising the steps of:

transmitting equipment input signals aboard the aircraft to a ground station;

transmitting equipment output signals aboard the aircraft to said ground station;

coupling the equipment input signals from aboard the aircraft to the inputs of an equipment at the ground station corresponding to the equipment aboard the aircraft;

comparing the output signals from the-equipment aboard the aircraft with the corresponding equipment output signals at the ground station and providing an equipment substitution signal when the output signals from the equipment aboard the aircraft differ with the output signals of the corresponding equipment at the ground station; and, substituting the output signals of the corresponding equipment at the ground station for the output signals of the equipment aboard the aircraft.

7. A method for controlling an aircraft under maneuvering conditions in emergency situations including loss of a functioning control surface comprising the steps of:

acquiring flight performance data from an aircraft in flight at altitudes above glide slope capture during a maneuvering condition; and, then utilizing non-linear aerodynamics to process the flight performance data for providing aircraft control for recoveries at higher altitudes.

8. A system for ground control of an aircraft comprising:

a pilot activated switch for providing a remote control transfer signal representative of pilot selection of ground control of the aircraft;

a transmitter-receiver responsive to said remote control transfer signal representative of pilot selection of ground control of the aircraft;

said transmitter-receiver providing data transfer through a data link to and from a ground station transmitter-receiver for ground station control of the aircraft; and, a cockpit camera couopled to said transmitter-receiver.

* * * * *